Oct. 6, 1953 B. ZARKY 2,654,834

TRANSMIT-RECEIVE SWITCH

Filed Nov. 1, 1949

INVENTOR.
BERT ZARKY

BY Foorman L. Mueller

ATTY.

Patented Oct. 6, 1953 2,654,834

UNITED STATES PATENT OFFICE 2,654,834

TRANSMIT-RECEIVE SWITCH

Bert Zarky, Chicago, Ill., assignor to Motorola, Inc., Chicago, Ill., a corporation of Illinois Application November 1, 1949, Serial No. 124,895

2 Claims. (Cl. 250—13)

Figures 1, 2:
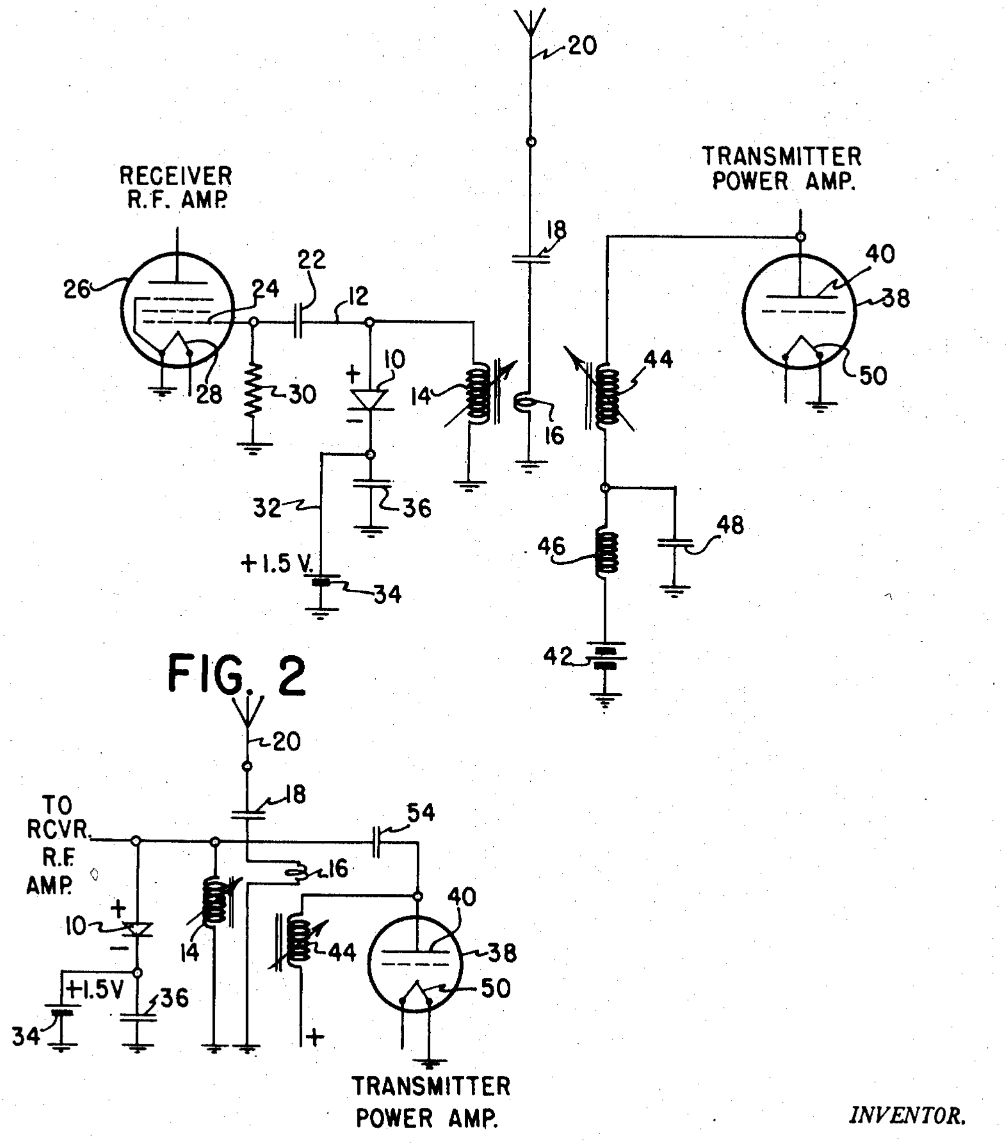

This invention relates to radio communication apparatus, and particularly to low-power, high-frequency, transmitter-receivers.

Where a radio transmitter and a radio receiver utilize the same antenna, provision usually is made for isolating the receiver from the transmitter during the periods of transmission, in order to protect the receiver from damage and to prevent the receiver from dissipating the power of the transmitter. In most cases relays operated by push-to-talk switches have been used for this purpose. Automatic devices of various kinds such as spark gaps and gaseous discharge tubes have been proposed heretofore to uncouple the receiver from the antenna when the transmitter is operating. These devices have not been adapted for use in low-power, high-frequency sets because they consume more power than the sets can afford to expend, particularly at the higher frequencies.

An object of the present invention is to provide an improved automatic transmit-receive switching device that does not require any appreciable power for its operation and which can be employed in low-power, high-frequency sets such as portable, battery-operated, transmitter-receivers.

A further object is to provide an improved transmit-receive switch that does not employ any moving parts nor any discharge means, such as a spark gap or a gas tube, which consumes a substantial amount of power.

A still further object is to provide novel means in a transmitter-receiver for automatically isolating the receiver from the transmitter whenever the signal fed to the input stage of the receiver rises above a certain low value, such as 1.5 volts.

A feature of the invention is the provision of an improved transmit-receive switch comprising a biased metallic-oxide rectifier (such as a germanium crystal) which affords a high impedance for low-level signals and a very low impedance for high-level signals (above 1.5 volts, for example).

Another feature is the provision of a novel receiver decoupling means using a metallic-oxide rectifier that consumes negligible power even at high frequencies.

The foregoing and other objects and features of the invention will be apparent from a study of the following description taken in connection with the accompanying drawing, wherein:

Fig. 1 is a schematic view illustrating a portion of a transmitter-receiver utilizing one embodiment of the invention; and Fig. 2 is a schematic view illustrating a modified form of the invention.

In practicing the invention, a suitable metallic-oxide rectifier, such as a germanium crystal, is arranged in the input circuit of the receiver section of a transmitter-receiver. The rectifier, in series with a source of biasing voltage, is connected to the antenna coupling network in such fashion as to prevent any coupling between transmitter and receiver when a very strong signal is impressed upon this network, but the coupling is not affected if weaker signals are picked up. Hence, all incoming signals (that is, signals picked up from space by the antenna) are fed with only slight attenuation to the receiver R. F. amplifier. Very strong signal voltages will be impressed upon the antenna coupling network during transmissions periods. The rectifier becomes conductive whenever the voltage impressed upon it exceeds the bias voltage, and when the rectifier conducts, the receiver R. F. amplifier is isolated or uncoupled from the antenna and from the transmitter. In this way the rectifier serves as a transmit-receive switch to prevent the receiver from loading the transmitter during transmission periods.

Fig. 1 shows one way in which the germanium-oxide rectifier 10 or other suitable metallic-oxide rectifier is arranged in the input circuit of a receiver. The positive terminal of the rectifier 10 is connected to a conductor 12 that leads to one end of a receiver tuning coil 14. The coil 14 and a transmitter tuning coil 44 are inductively coupled to the antenna 20 by a link coil 16 which provides appropriate transformation ratios for impedance matching purposes. The coil 16 is coupled by a capacitor 18 to the common antenna 20 of the transmitter-receiver. The conductor 12 is coupled through a blocking capacitor 22 to the control grid 24 of an amplifier tube 26 in the radio-frequency amplifier stage of the receiver. The filamentary cathode 28 of the tube 26 is connected to ground, as indicated, and a grid coupling resistor 30 is connected between the control grid 24 and ground.

One end of the receiver tuning coil 14 is connected to the conductor 12, as previously mentioned, and the other end of the coil 14 is grounded as shown. The negative terminal of the rectifier 10 is connected by a conductor 32 to the positive terminal of a bias-voltage source 34 that is grounded on its negative side. A bypass capacitor 36 between the conductor 32 and ground affords a path for high-frequency currents. The rectifier 10, in series with the bias-voltage source 34, shunts the inductor 14. The voltage furnished by the biasing source 34 is selected to be of such a value that the rectifier 10 is nonconductive for all input signals below a certain level, for example, 1.5 volts. This allows signals picked up by the antenna 20 from space to pass with only slight attenuation to the control grid 24 of the receiver R. F. amplifier.

The transmitter power amplifier includes an amplifier tube 38 having a plate 40 which is connected to a source of plate voltage 42 through the tuning coil 44 and a choke 46. A bypass capacitor 48 shunts the choke 46 and the power supply 42 for high-frequency currents. The filamentary cathode 50 of the tube 38 is grounded as shown. Normally the receiver R. F. amplifier and the transmitter power amplifier are critically coupled to each other through the medium of the coils 14 and 44. Critical coupling is that amount of coupling which produces the maximum transfer of energy between the coupled circuits.

When the transmitter is operating, signals are passed to the antenna 20, which radiates the same into space. If the receiver were not isolated from the transmitter during transmission periods, the receiver would absorb a substantial amount of power from the transmitter and might be damaged by the strong signal coming from the transmitter. The germanium rectifier 10 prevents this by becoming electrically conductive when the signal voltage in the coil 14 rises above a certain value, such as 1.5 volts. When conducting, the rectifier 10 has a resistance of around 200 ohms, as compared with a resistance of about a megohm when it is nonconductive. The capacitance of the rectifier 10 is very small so that it acts substantially as a pure resistance.

The receiver R. F. amplifier is critically coupled to the transmitter power amplifier when the rectifier 10 is nonconductive. However, when the signal level rises above the predetermined maximum value (1.5 volts) and the rectifier 10 becomes conductive, the low-resistance shunt which the rectifier 10 places across the input coil 14 greatly reduces the circuit Q. This uncouples or isolates the receiver R. F. amplifier from the transmitter power amplifier and from the antenna 20. When the transmission ceases, the signal level drops and the rectifier again becomes nonconductive, thereby restoring the circuit Q to its normal value and coupling the receiver R. F. amplifier to the antenna 20 again, so that signals picked up by the antenna 20 from space may be received. In this way, the rectifier 10 serves as an automatic transmit-receive switch for alternately coupling the receiver to the antenna during reception periods and uncoupling the receiver from the antenna during transmission periods.

Fig. 2 illustrates a portion of a transmitter-receiver system similar to that shown in Fig. 1, except that the receiver R. F. amplifier is coupled by the capacitor 54 to the coil 44 in the plate circuit of the transmitter power amplifier. The coils 14 and 44, in this instance, are not inductively coupled to each other. The antenna link coil 16 is inductively coupled to the transmitter coil 44 but not to the receiver coil 14 (being indirectly coupled to the coil 14 through the medium of the coil 44 and the coupling capacitor 54). The coupling between receiver and transmitter, as before, is critical when the rectifier 10 is nonconductive and is substantially non-existent when the rectifier 10 conducts during transmission periods. Many other forms of coupling networks, both inductive and capacitive or a combination of both, may be employed in lieu of those shown in Figs. 1 and 2 for utilizing the rectifier 10 as an uncoupling device.

The above described type of transmit-receive switching device has the advantage that it consumes very little power, even at high frequencies, and therefore is admirably suited for use in low-power transmitter-receivers, particularly those of the portable, battery-operated type. Its action is practically instantaneous, and it does not require any special "keep-alive" voltage source as do many of the transmit-receive switches now available. The bias-voltage source 34 may be the same source as that which supplies current to the filaments as 28 and 50 of the tubes in the receiver and transmitter. The switch furthermore has no moving parts and does not require any adjustments. The transmitter operates very efficiently with this arrangement, and the receiver is well protected from over-loads.

While there has been disclosed what is at present considered to be the preferred embodiment of the invention, it will be understood that various modifications thereof may be made within the true spirit and scope of the invention as set forth in the appended claims.

I claim:

1. In a radio transmitter-receiver system, the combination including a common antenna circuit, an input circuit for applying signals to the receiver portion of said system and including a high-Q inductance coil coupled to said antenna circuit, a metallic-oxide rectifier shunted across said inductance coil in said receiver input circuit presenting negligible capacitance to said input circuit, biasing means coupled to said rectifier to render said rectifier non-conductive to signals below a selected threshold so that optimum coupling between said input circuit and said antenna circuit is maintained for such signals, an output circuit for the transmitter portion of said system, a high-Q inductance coil included in said output circuit and coupled to said antenna circuit and to said receiver input circuit and supplying a signal to the latter circuit exceeding the aforesaid threshold to render said rectifier conductive and place a low resistance shunt across said inductance coil in said receiver input circuit reducing the Q thereof and decoupling said input circuit from the output circuit of said transmitter and from said antenna circuit.

2. In a radio transmitter-receiver system, the combination including a common antenna circuit, an input circuit for applying signals to the receiver portion of said system and including a high-Q inductance coil coupled to said antenna circuit and having one side connected to a point of reference potential, a metallic-oxide rectifier and a source of bias potential connected in series across said inductance coil in said receiver input circuit and presenting negligible capacitance to said input circuit, said bias source rendering said rectifier non-conductive to signals below a selected threshold so that optimum coupling between said input circuit and said antenna circuit is maintained for such signals, a high-frequency by-pass capacitor coupling the junction of said rectifier and said source to said point of reference potential, an output circuit for the transmitter portion of said system, a high-Q inductance coil included in said output circuit and coupled to said antenna circuit and critically coupled to said receiver input circuit and supplying a signal to the latter circuit exceeding the aforesaid threshold to render said rectifier conductive and place a low resistance shunt across said inductance coil in said receiver input circuit reducing the Q thereof and decoupling said input circuit from the output circuit of said transmitter and from said antenna circuit.

BERT ZARKY.

References Cited in the file of this patent

UNITED STATES PATENTS

| Number | Name | Date |
|---|---|---|
| 1,872,398 | Brown | Aug. 16, 1932 |
| 1,970,423 | Frink | Aug. 14, 1934 |
| 2,144,836 | Dietrich | Jan. 24, 1939 |
| 2,412,161 | Patterson | Dec. 3, 1946 |
| 2,413,939 | Benware | Jan. 7, 1947 |
| 2,426,581 | Atkins | Sept. 2, 1947 |
| 2,438,367 | Keister | Mar. 23, 1948 |
| 2,438,944 | Ransley | Apr. 6, 1948 |

FOREIGN PATENTS

| Number | Country | Date |
|---|---|---|
| 204,529 | Germany | Nov. 14, 1908 |